United States Patent [19]

Lindquist et al.

[11] Patent Number: 5,000,762

[45] Date of Patent: Mar. 19, 1991

[54] METHOD FOR SEPARATING DIOXINS FROM GASES

[75] Inventors: Björn K. V. Lindquist; Erik E. Solbu, both of Skelleftehamn, Sweden

[73] Assignee: Boliden Contech AB, Stockholm, Sweden

[21] Appl. No.: 426,438

[22] Filed: Oct. 25, 1989

[30] Foreign Application Priority Data

Nov. 30, 1988 [SE] Sweden .............................. 8804332

[51] Int. Cl.$^5$ .............................................. B03C 3/00
[52] U.S. Cl. ........................................... 55/8; 55/11; 55/71; 110/215
[58] Field of Search .................. 55/8, 10, 11, 71, 107; 110/203, 215, 216; 423/245.1

[56] References Cited

U.S. PATENT DOCUMENTS

| | | | |
|---|---|---|---|
| 2,525,347 | 10/1950 | Gilman | 55/10 |
| 4,193,774 | 3/1980 | Pilat | 55/10 |
| 4,502,396 | 3/1985 | Teller | 55/71 |

FOREIGN PATENT DOCUMENTS

| | | | |
|---|---|---|---|
| 153382 | 3/1979 | Japan | 55/11 |
| WO88/08325 | 11/1988 | PCT Int'l Appl. | |
| 421811 | 12/1934 | United Kingdom | 55/10 |

OTHER PUBLICATIONS

Waste Management and Research 5(3) 1987, "Report: Emission of Dioxin and Related Compounds from Italian Municipal Waste Incinerators", Magagni.

*Primary Examiner*—Bernard Nozick
*Attorney, Agent, or Firm*—Burns, Doane, Swecker & Mathis

[57] ABSTRACT

The invention relates to a method for extracting dioxins and like highly toxic, organic contaminants from a gas. The invention is characterized by contacting the gas with a liquid aerosol over a pre-determined period of time, and by electrically charging the particles present in the aerosol, both solid and liquid particles, and subsequently separating the particles from the gas, preferably with the aid of a wet electrostatic precipitator.

12 Claims, No Drawings

METHOD FOR SEPARATING DIOXINS FROM GASES

The present invention relates to a method for separating dioxins and similar, highly toxic organic compounds from gases. The invention relates particularly to gases which are released to atmosphere in large quantities, particularly from such incinerators and industrial processes as those in which chlorine-containing materials are treated, for example waste incinerators and certain chemical and metallurgical industries.

Dioxins belong to the highly toxic organic compounds to which notice has been brought progressively by environmental authorities, and the limit values of which, prior to emission, have consequently been lowered continuously in keeping with the development of progressively more sophisticated analysis methods. One of the most common types of dioxin is polychlorodimenzo-p-dioxin, which is normally referred to by its acronym PCDD. Normally, the dioxin quantities are converted to tetrachlorodibenzo-p-dioxin (TCDD) and thus given in TCDD-equivalents (TCDD-equ.). Furans also belong to the group of highly toxic compounds relevant in a similar context. An important furan-compound is tetrachlorodibenzo-furane (TCDF).

One significant source in the generation and emission of dioxins and furans is the incineration of garbage and other municipal waste. The risk of generating and releasing extremely toxic substances of this nature have, in many countries, restricted the construction of new waste-incinerators, and even made the construction of such plants impossible, and consequently there is an urgent need for a waste incineration method which is safer and more attractive from the aspect of environmental care and protection.

Certain advances have been made with respect to an optimum choice of incineration temperature and flue gas temperature, for minimizing the formation and release of these toxic substances. WO88/00672 describes a method in which an attempt to avoid the formation of dioxin is made by adding sodium carbonate for the purpose of removing HCl and /or $Cl_2$ from the gas. It has also been established that waste which has a high moisture content can, in certain cases, result in the formation of large quantities of dioxins and furans.

It has also been found possible to reduce essentially the release of dioxins and furans, by incorporating an afterburner chamber in certain waste-incineration plants. Systems in which afterburning is followed by a wet-dry lime scrubber and a wet electrostatic precipitator have been described in the literature (Waste Management & Research 5(3) 1987 pp.414–416). This publication describes an experiment, carried out in practice, in which waste was combusted with the view of obtaining the highest possible degree of purity with respect to the toxic substances TCDD and TCDF. This experiment involved spray-drying a lime slurry with the aid of smoke gases generated by the incineration process, wherewith solid lime particles were formed in the gas. The intention of this experiment was to adsorb the dioxins and similar toxic contaminants on the newlyformed, fine lime particles, which were then separated in the downstream wet electrostatic precipitator. The lime scrubber-wet electrostatic precipitator-system resulted in a reduction of the TCDD-quantities emitted from the afterburner chamber, this reduction reaching to less than 50%, despite 98% of the particles being caught in the wet electrostatic precipitator. A similar method is described in EP-A-0208490, although in this case the slurry contains activated-carbon particles. This shows that the low limit values placed today on the emission or formation of such toxic substances cannot be met, not even with the aforesaid advanced and modern waste destruction plants.

Another, similar solution is based on the addition of dry lime to the gas and on the separation of dust and lime accompanying the gas, in a combination of cyclones and "hose and bag filters". This method achieves an improved gas/ particle contact in comparison with the aforedescribed separation of dioxins on lime particles in a wet electrostatic precipitator, the separation of dioxin being favoured. One drawback with the cyclone-hose-and-bag filter separation process is that because of the often considerable quantities of gas to be cleansed in the case of waste incineration processes, the plant costs for the separation apparatus are relatively high. When separation is effected in accordance with the aforesaid "dry" methods, the high gas temperatures concerned also limit the efficiency of the methods with respect to the elimination of dioxin, due to the fact that dioxins are present in the gas phase in excessive quantities and do not become adsorbed, not even on the finest of the particles, which in turn can be more readily caught in hose filters than in dry wet electrostatic precipitators. A similar dry method is described, for instance, in DE-A-34 26059, in which a bed of activated carbon is used to adsorb contaminants, and in W080-00922, according to which there is used an aerosol which contains solid reactive particles which result in a chemical reaction with the contaminants.

A principally different smoke-gas purifying system has newly been developed by Götaverken Energy System and Stockholm Energi, this system having been recently taken into operation in Gothenburg, Sweden. This system comprises two in-line connected packed tower washers, of which the first is a washing reactor operating at 65°–70° C., and the other is a condensation reactor operating at 30°–35° C. The ingoing TCDD-equivalent-contents of the smoke gas in the test plant, which has been in operation for a relatively long period of time, lies between 1.8 and 6.4 $ng/m^3$, and the outgoing contents lie between 0.12 and 0.24 $ng/m^3$, although it is not believed that a full scale plant will be capable of managing more than 0.5 $ng/m^3$. It is stated that future plants will achieve limit values of less than <0.1 ng TCDD-equivalent/$m^3$.

Other wet methods are described in SE-B-440608, which are used to separate water-soluble contaminants by the addition of chemicals to the system, and EP-A-0291225, according to which there is utilized an exothermic ion-reaction on particle surfaces, by turbulent flow of a mixture of gas and water droplets. Another wet method is described in W088/01711, in which organic contaminants are degraded by heating a gas-water mixture at high temperatures (750°–1800° C.).

It has now surprisingly been found possible to provide a method with which dioxins and like toxic, organic substances can be isolated so effectively that the limit values relating to these toxic substances can also be managed by future gas purifying plants with the increasing requirements on purity that can be expected.

By separation is meant in this connection the general removal of contaminants from gas so as to cleanse the gas of such contaminants.

Thus, in accordance with the invention, the gas obtained from the dioxin source is brought into contact with a liquid aerosol over a pre-determined time period, whereafter the gas is separated from the particles present in the aerosol, both solid and liquid particles, subsequent to applying an electric charge to the particles.

By aerosol is meant generally a suspension of extremely fine, solid or liquid particles in air or some other gas. Normal examples in this respect are smoke, fog and smog. In the following, aerosols which contain liquid particles are also referred to as liquid mists, which is the technical term most used in this connection.

The liquid used in the inventive method may be any liquid capable of forming an aerosol and capable of being handled in existing vessels and conduits, without causing corrosion and other problems. The simplest and cheapest liquid available is water, although water is liable to become acidified progressively, as a result of absorbing acid constituents from the gas. Consequently, it may be desirable to add alkali, in order to restrict the acidity of the water. The liquid is transferred in the form of an aerosol with the aid of an appropriate nozzle, or by blowing-in steam. It is highly advantageous from a practical point of view, to use a scrubber-type washer for the purpose of forming the aerosol.

The contact time between the aerosol and the gas can be readily controlled and adjusted, by suitable selection of apparatus dimensions. In this respect, attention should not only be paid to gaseous contaminants with rapid diffusion rates, but also to more sluggish, solid microparticles caught up in the liquid mist.

The particles in the aerosol, both solid and liquid, can be charged electrically either directly as the aerosol is produced, or by subsequently applying an electric charge to the aerosol, after it has been formed.

The electrically-charged aerosol particles can be separated from the gas in various ways, although it is important to effect separation in the presence of liquid droplets in the gas. Separation is preferably effected in an electric field generated in a wet electrostatic precipitator. The gas is preferably cooled during the separation process, to a temperature of about 60° C. or even lower, in order to achieve effective separation.

The invention will now be described in more detail with reference to a preferred embodiment adapted for cleansing smoke gas downstream of a waste incineration plant, and with the aid of an embodiment in which the invention is used to cleanse gases emitted from a chemical industry.

Gas originating from the waste incineration process is first passed through a boiler and a dry wet electrostatic precipitator, in which the gas is cooled and roughly cleansed of dust. In order to further reduce the temperature of the gas entering the downstream scrubber, the gas is cooled, preferably indirectly with water, in a heat exchanger located immediately above the scrubber inlet. This will also enable the thermal energy content of the gas to be recovered. The scrubber preferably has the configuration of a tower with a conical upper part and bottom, and suitably has a central gas-inlet conduit at the top and the gas outlet arranged via an annular chamber close to the bottom of the tower. The object of this configuration is to achieve uniform gas distribution, and therewith a satisfactory cleansing effect, to the best possible extent. As a result of the turbulence created adjacent the gas outlet from the insert pipe in the tower part, the scrubber liquid entering through the nozzle rings arranged adjacent the gas inlet is broken down into small droplets and forms a liquid mist, which is admixed with the gas in the scrubber so effectively and so thoroughly that contaminants carried by the gas are caught up in the liquid mist. The tower is dimensioned in a manner which will provide sufficient contact time for effective capture of the contaminants by the liquid mist.

In order to avoid the build-up of sludge coatings, the bottom of the tower is empty under normal operating conditions, but when necessary can be used as a buffer facility for scrubber liquid. The liquid leaving the scrubber is led to a pump tank, from which the liquid is pumped to the nozzle rings in a circuit path.

Since the gas generated by the incineration of waste often contains large quantities of hydrochloric acid, the scrubber liquid becomes highly acidified, unless it is neutralized. The liquid is preferably neutralized by introducing measured quantities of lime slurry into the pump tank. In this case, a slaked-lime silo is placed in a position in which the lime can be readily metered to a slurry tank. The lime is mixed with scrubber liquid in the slurry tank, with the aid of an agitator, and is then pumped with the aid of a controllable pump, into the pump tank where it is mixed with return flow from the scrubber, with the aid of a further effective agitator.

The quantities in which lime slurry is added to the scrubber liquid is controlled by the pH of the liquid in the circuit. A pH of between 1.5 and 2.0 is considered an optimum value, when taking into account acid absorption, the risk of gypsum precipitation, corrosion and improved pH-control possibilities in the subsequent water purification process. Condensate from the downstream wet electrostatic precipitator, which also functions as a cooling stage, is also delivered to the tank, making it necessary to bleed off a corresponding amount of scrubber liquid. Contaminants, such as dioxin, will concentrated in the aerosol in the scrubber, since the specific surface area of the aerosol is very large in relation to the volume of the aerosol. The gas is then passed to a wet electrostatic precipitator, in the illustrated case a filter of the condensing type, in which the contaminant content of the aerosol particles is effectively isolated. The wet electrostatic precipitator also functions as a gas cooler, since the precipitation tubes (the electrodes) are surrounded by a jacket in which cooling water is circulated. This cooling effect, in conjunction with the separation of contaminants in wet electrostatic precipitators, also has other advantages, as will become apparent from the following.

When condensation takes place on a normal, cold surface, water vapour diffuses onto the surface and forms a liquid. Saturation can take place, however, in the proximity of said surface already in the gas phase, and mist particles are condensed. These mist particles do not obey the diffusion laws of water vapour and can therefore be drawn back into the gas flow, which means that the contaminants that have accumulated on the mist droplets will also be drawn back into the gas. However, by permitting this condensation process to take place within an electric field in a wet electrostatic precipitator, the mist particles will, instead, be separated in a highly effective fashion, therewith considerably enhancing the cleansing effect.

Cooling of the gas in the wet electrostatic precipitator enables the use of construction materials different to those normally used in this context, namely lead and plastic. For instance, stainless steel having good corrosion properties can be used advantageously in the precipitation tubes, therewith providing a robust installation which can be easily maintained. The emission electrodes may also be made of steel, whereas the inlet chamber is made of plastic reinforced with fibreglass.

Cooling water is preferably delivered to the wet electrostatic precipitator from a nearby water mains. Wet electrostatic precipitators of the aforesaid kind constructed from stainless steel are sold under the trade name EDITUBE (Edifo AB, Skelleftea, Sweden).

EXAMPLE

A gas originating from an industrial process and containing, from an environmental aspect, very large quantities of dioxins and dibensofurans, was treated in accordance with the method of the invention over a relatively long test period, wherein the aerosols were produced in a scrubber and separation was effected in a wet electrostatic precipitator. 310 $Nm^3$ of gas were treated each hour and the gas had a content of TCDD-equ. (Nordic Standard) of on average about $50mg/n^3$.

Samples were taken during the test period and analysed by two mutually indepent groups of experts in this field. It was found from these analyses that average degree of separation was in the region of from 99.7 to 99.9%.

We claim:

1. A method for separating dioxins and other highly toxic organic contaminants from a gas, comprising the steps of:

(a) contacting the gas containing dioxins with a liquid aerosol for a pre-determined period of time, thereby forming a dioxin aerosol mixture;

(b) electrically charging the aerosol particles present in the mixture, said aerosol particles including both solid and liquid particles;

(c) cooling the mixture in a wet electrostatic precipitator to a temperature sufficient to allow separation of the solid and liquid particles from the gas in said precipitator;

(d) separating said solid and liquid particles including dioxins from said gas with said wet electrostatic precipitator.

2. A method according to claim 1, including the step of cooling the gas to a temperature of about 60° C. or therebeneath during the separation process.

3. A method according to claim 1, including the step of controlling the pre-determined time period through the selection of appropriate apparatus dimensions for effecting said aerosol contact.

4. A method according to claim 1, including the step of adding alkali to the liquid forming the liquid aerosol.

5. A method according to claim 1, including the step of bringing the liquid to an aerosol form with the aid of a nozzle or by adding steam.

6. A method according to claim 5, including the step of controlling the pre-determined time period through the selection of appropriate apparatus dimensions for effecting said aerosol contact.

7. A method according to claim 5, including the step of cooling the gas to a temperature of about 60° C. or therebeneath during the separation process.

8. A method according to claim 5, including the step of forming the aerosol in a gas/liquid scrubber.

9. A method according to claim 8, including the step of cooling the gas to a temperature of about 60° C. or therebeneath during the separation process.

10. A method according to claim 8, including the step of controlling the predetermined time period through the selection of appropriate apparatus dimensions for effecting said aerosol contact.

11. A method according to claim 10, including the step of cooling the gas to a temperature of about 60° C. or therebeneath during the separation process.

12. A method for separating dioxins and other highly toxic organic contaminants from a gas, comprising the steps of:

(a) contacting the gas containing dioxins with a liquid aerosol for a pre-determined period of time, thereby forming a dioxin aerosol mixture;

(b) electrically charging the aerosol particles present in the mixture, said aerosol particles including both solid and liquid particles;

(c) cooling the mixture to a temperature sufficient to allow separation in step (d); and (d) separating said solid and liquid particles including dioxins from said gas with a wet electrostatic precipitator.

* * * * *